June 3, 1924.
W. L. DEMPSEY
INTERNAL COMBUSTION ENGINE
Filed Nov. 15, 1918
1,496,453
2 Sheets-Sheet 2
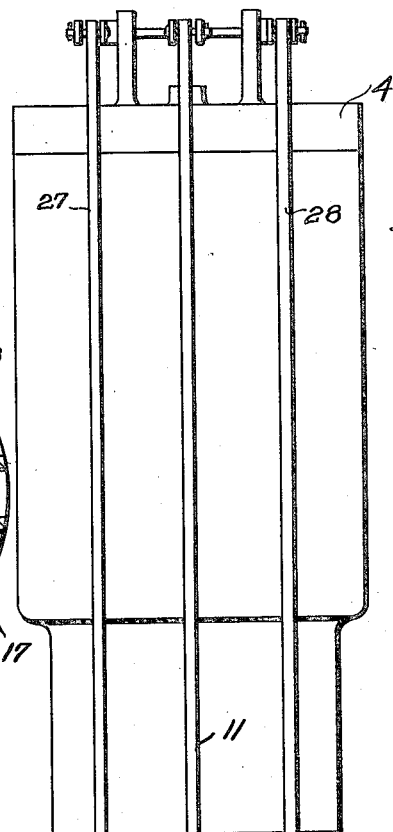
Fig. 2.
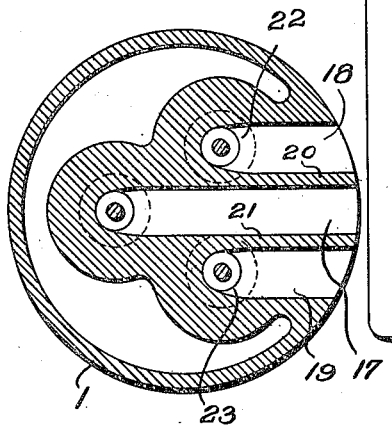
Fig. 3.
Fig. 4.
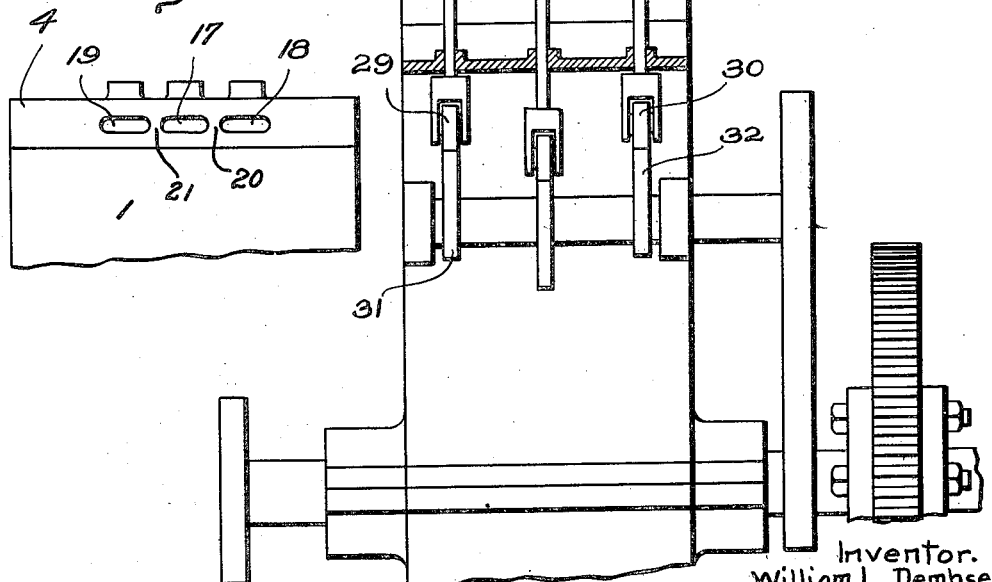
Inventor.
William L. Dempsey
by Heard Smith & Tennant
attys.

Patented June 3, 1924.                                                    1,496,453

UNITED STATES PATENT OFFICE.

WILLIAM L. DEMPSEY, OF PHILADELPHIA, PENNSYLVANIA, ASSIGNOR TO DEMPSEY CYCLE COMPANY INCORPORATED, OF PHILADELPHIA, PENNSYLVANIA, A CORPORATION OF DELAWARE.

INTERNAL-COMBUSTION ENGINE.

Application filed November 15, 1918. Serial No. 262,669.

*To all whom it may concern:*

Be it known that I, WILLIAM L. DEMPSEY, a citizen of the United States, residing at Philadelphia, county of Philadelphia, State of Pennsylvania, have invented an Improvement in Internal-Combustion Engines, of which the following description, in connection with the accompanying drawing, is a specification, like characters on the drawing representing like parts.

This invention relates to improvements in internal combustion engines and comprises the utilization of a novel process or cycle of operation adapted to increase the efficiency of a four-cycle internal combustion engine of a usual type when used with any kind of liquid fuel, over that of the usual types of internal combustion engine and also to adapt the engine for use with both heavy and light hydrocarbon.

In my prior Patent No. 1,261,779 a process and apparatus is disclosed which comprises the supplying of the cylinder of an internal combustion engine from a suitably controlled usual type of carbureter or vaporizer during the charging stroke with a charge of hydrocarbon and air preferably overrich in hydrocarbon, forcing cool air under pressure into the said cylinder at the end of the charging stroke thereby increasing the specific gravity of the charge and supplying additional oxygen to the cylinder to cause a complete combustion of the fuel, compressing the charge upon the return stroke of the piston, igniting the charge to impel the piston in its work producing stroke and finally exhausting the products of combustion. By further experimentation I have found that the cylinder during the charging stroke is below atmospheric pressure and that an additional supply of oxygen may be introduced at atmospheric pressure. One of the objects of the present invention therefore consists in producing a novel cycle in internal combustion engines by introducing an over-rich charge of hydrocarbon and air during the intake stroke from a usual carbureter or vaporizer, the amount of the charge being regulated by the usual throttle, and at the end of said intake stroke admitting additional pure air at atmospheric pressure and temperature. A further object of the invention is to provide a more efficient cycle by introducing at the end of the charging stroke not only air but also air saturated with water. A further object of the invention is to provide a cycle for an internal combustion engine in which the cylinder will be charged at each stroke with a constant volumetric charge and consequently said charge will have a uniform compression upon all compression strokes at all throttle settings, all speeds and all loads. This is accomplished by introducing an ignitible mixture of air and hydro-carbon during the beginning of the suction stroke and automatically supplementing the cylinder content at or near the end of the suction stroke with a varying amount of atmospheric air at a standard pressure and temperature sufficient to bring the cylinder content up to approximately atmospheric pressure.

The mixture portion of the charge must be heated to a temperature greater than atmospheric, and preferably to a temperature equal to or greater than the average distillation temperature of the fuel used. This is to cause the charge to stratify, the charge being at the top and the air at the bottom, so that the spark plugs will be surrounded by the substantially undiluted ignitible mixture at the time ignition takes place.

The speed and power of the engine is regulated and controlled solely by regulating and controlling the amount and quantity of the mixture portion of the charge and is not effected by the quality of the air admitted at the end of the vacuum stroke. The automatic introduction of air is regulated by the intensity of the Toricellian vacuum which varies with the throttle control of the mixture portion of the charge. The automatic introduction of water with the air is controlled in the same manner at all throttle settings, all speeds and all loads.

A further object of the invention is to provide an engine construction capable of producing the cycle of operations above described.

A further object of the invention is to provide for the complete gasification of the fuel by the application to it of an amount of heat greater than that at which the fuel was originally distilled, then adding a sufficient amount of air to raise the charge to atmospheric pressure, also retarding the rise in temperature due to compression sufficiently to obtain efficient compression pressures by the introduction of cooling elements, such as air and water, into the cylinder at the beginning of the compression stroke, and finally expelling from the cylinder the products of combustion. By means of this invention an equalization of temperature is obtained in the piston and cylinder walls which will permit the use of a tighter fitting piston with the maintenance of a proper clearance between the piston and cylinder walls without danger of the piston binding or becoming too loose.

Other objects and features of the invention will more fully appear from the following description and will be pointed out in the annexed claims.

The cycle or process of producing work from an internal combustion engine forming the subject matter of the present invention is primarily designed and intended for the use of fuels having a high distillation point such as low grade gasolene, kerosene and fuel oils, and to charge the cylinder with air containing more oxgen than is required for complete combustion of the hydrocarbon.

In brief my invention contemplates, first, subjecting the fuel to a greater amount of heat than that at which the fuel was originally distilled; second, supplying the cylinder during the charging stroke with a regulatable mixture of hydrocarbon and air which is overrich in hydrocarbon; third, introducing into the cylinder at the end of the charging stroke an additional amount of air, or air and water thereby increasing the volume and pressure within the cylinder; fourth, compressing the mixture upon the return stroke of the piston; fifth, igniting the mixture and causing the expansion produced thereby to drive the piston on its working stroke; and sixth, exhausting the products of combustion from the cylinder, the expulsion of the exhaust products of combustion being accelerated by the admission of atmospheric air upon substantial completion of the power stroke of the piston.

A preferred mechanism for accomplishing these purposes is illustrated in the accompanying drawing in which—

Fig. 2 is a side elevation of the same;

Fig. 3 is a horizontal transverse sectional view on the line 3—3, Fig. 1;

Fig. 4 is a side elevation of the upper portion of the cylinder and cylinder head.

Figure 1:
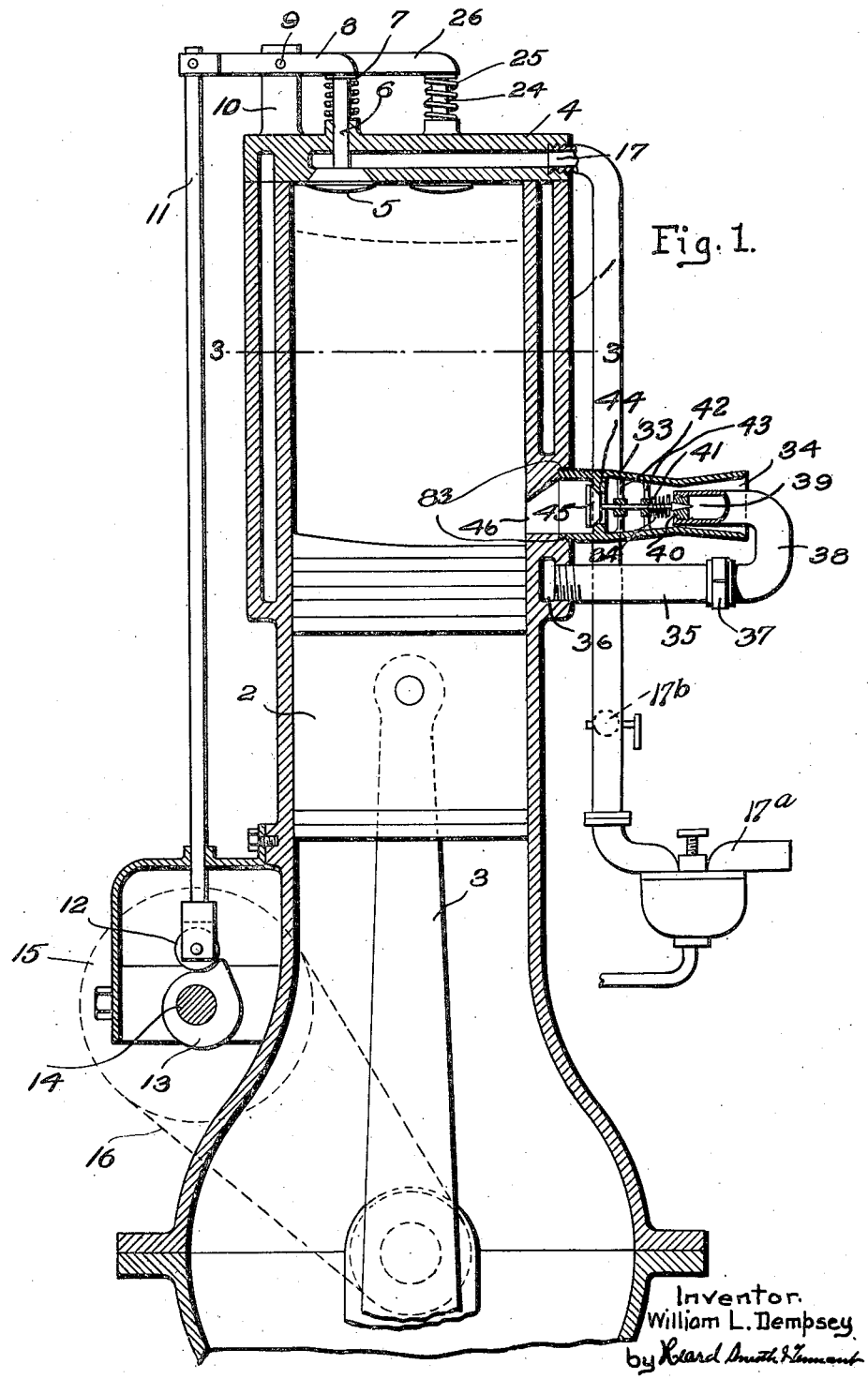
Figure 1 is a vertical longitudinal sectional view of a sufficient portion of an engine of the four cycle type to show my invention applied thereto.

The invention illustrated herein comprises the usual water jacketed cylinder 1 having a piston 2 reciprocable therein said piston being connected to a piston rod 3 adapted to actuate the usual crank shaft. The cylinder is provided with a head 4 having valve openings for the introduction of the charge and for the expulsion of the exhaust, these openings being controlled by spring-pressed valves. In the preferred embodiment of my invention illustrated herein a single charging valve 5 is provided which is carried upon a valve stem 6 and is held normally seated by the spring 7. The stem 6 of the valve 5 is engaged by a lever 8 mounted upon a pivot 9 carried by a stand 10. The opposite end of the lever 8 is connected to a rod 11 which has at its lower end an anti-friction roller 12 resting upon a cam 13 secured to the usual crank shaft 14 which carries a sprocket 15 which is rotated through a chain 16 from a suitable sprocket upon the crank shaft, not shown. The cylinder head is provided with an intake 17 which desirably is located diametrically of the cylinder and extends beyond the center thereof and is supplied with a suitable hydrocarbon mixture, overrich in hydrocarbon, from a carbureter 17$^A$ of any usual type, the amount of mixture introduced into the cylinder being regulated by the usual throttle valve 17$^B$ in the intake 17. Preferably two exhaust ports 18 and 19 are provided which extend into the cylinder head in parallelism with the intake port 17 the walls 20 and 21 between the intake port and the exhaust port being comparatively thin and providing means for readily transmitting the heat of the exhaust to the charge as it is being drawn into the cylinder by the suction stroke of the piston. The exhaust valves 22 and 23 may be and preferably are similar in construction to the valve of the intake port and have stems 24 surrounded by helical springs 25 which normally tend to hold the valves seated. The exhaust valves are actuated by levers 26 which are pivotally mounted upon the stand 10 and are actuated through rods 27, 28 which have at their lower ends anti-friction rollers 29, 30 which rest respectively upon cams 31, 32 carried by the cam shaft 14. By placing exhaust ports closely adjacent to each side of the intake port the walls of the intake port will be highly heated so that the charge of explosive mixture, which preferably is overrich in hydrocarbon, will be heated as it enters the cylinder to a temperature higher than the temperature at which said hydrocarbon was distilled. By thus heating the charge as it is introduced into the cylinder the condensation which occurs in usual types of engines is eliminated and the undesirable action of the condensing material upon the walls of the piston and cylinder is prevented.

Thus a more efficient engine structure is provided.

One of the main features of the present invention comprises the introduction of air at atmospheric pressure at the end of the intake power strokes of the engine preferably water being introduced in conjunction with the air.

In the preferred embodiment of the invention illustrated herein the air or air and water is introduced through a Venturi tube leading into the cylinder at a point just above the limit of the stroke of the piston upon its intake stroke. The Venturi tube 33 converges from its ends toward the middle portion, one end being provided with a thread 83 which engages suitable screw threads in the wall of the cylinder, the other end 34 of said tube being open to the atmosphere. Preferably water is introduced by induction in the form of a jet centrally of the narrowest portion of the Venturi tube. This is conveniently accomplished by providing a pipe or conduit 35 leading from a portion 36 of the water jacket, said tube preferably being made in sections connected by a union 37, one of said sections 38 being U-shaped and terminating in a nozzle 39 provided with an adjustable nipple 40 forming a seat for a needle valve. A needle valve 41 is mounted in spiders 42, 43 extending across the Venturi tube and the inner wall of the tube is provided with an inwardly projecting flange forming a valve seat 44 which is engaged by a poppet valve 45 carried upon the end of the stem of the needle valve 41. I have found by experimentation that in the operation of an engine thus constructed the contents of the cylinder are at the end of the charging stroke at less than atmospheric pressure, consequently as the piston 2 passes the port 46 to which the Venturi tube 33 leads the valve 45 will be opened by the difference in pressure between the interior of the cylinder and the atmosphere and a supplemental amount of air will be drawn into the cylinder which will supply an additional amount of oxygen to the cylinder so that the combustion of the mixture, which previously was overrich in hydrocarbon, will be complete. As the valve 45 is thus opened the needle valve 41 is withdrawn from its seat upon the end of the nipple 40 so that a small amount of water will be drawn in by inspiration or induction. This water has the double effect of reducing the temperature of the contents of the cylinder and of cooling the piston. The reduction of the temperature of the charge enables a greater charge to be introduced into the cylinder, since the cold air and water are preferably introduced while the intake port for the hydro-carbon mixture is still open, and the chilling of the charge causes it to contract in volume thereby permitting an additional amount to flow into the cylinder. As the cooling of the charge increases its density an increased compression is attained upon the compression stroke of the piston. Consequently when the mixture is ignited an increased amount of power is obtained.

The nipple 40 of the nozzle 39 may be adjusted relatively to the needle of the needle valve either by screwing the nipple forward or back or by manipulation of the union 37 to correlate the supply of water to the demand of the engine.

As the piston returns upon its compression stroke the poppet valve 45 will immediately close the port 46, thus preventing the escape of any of the supplemental air introduced into the cylinder and an increased compression of the contents of the cylinder will be produced, thus increasing the power of the engine when the mixture is exploded.

Inasmuch as the piston during its movement upon the power stroke which is produced by the explosion of the mixture will pass the port 46 near the end of its power stroke, the valve 45 will be opened by the partial vacuum produced in the cylinder by the inertia of the gases rushing from the exhaust ports, which in usual four-cycle engines are opened before the piston has reached the limit of its power stroke. As the valve 45 thus opens, a supplemental amount of air will again enter the cylinder and upon the exhaust stroke of the piston will more efficiently scavenge the cylinder of the products of combustion.

It will be understood that the embodiment of the invention disclosed herein is illustrative but not restrictive and that various changes may be made in structure in relation to parts, etc. within the meaning and scope of the following claims.

Having fully described my invention, what I claim as new and desire to secure by Letters Patent is:

1. The process of producing work from a four-cycle internal combustion engine comprising a cylinder having a piston reciprocable therein and means for supplying a regulated mixture of hydrocarbon and air to said cylinder; which consists in supplying the cylinder with an explosive mixture of hydrocarbon and air over-rich in hydrocarbon, introducing a supplemental amount of air at atmospheric pressure into said cylinder adjacent the end of the piston near the end of the charging stroke sufficient in quantity, to produce an approximately constant volumetric charge in said cylinder irrespective of the amount or quality of the charge of explosive mixture, and thereby supplying sufficient oxygen to the cylinder to cause approximately complete combustion of the fuel, preventing the escape from the cylinder of any of the supplemental air thus introduced, compressing the charge upon the return stroke of the piston, igniting the charge to impel the piston upon its working stroke, exhausting the products of combustion from the cylinder in part by the admission of air into the cylinder at the end of the working stroke.

2. The process of producing work from a four-cycle internal combustion engine comprising a cylinder having a piston reciprocable therein and means for supplying a regulated mixture of hydrocarbon and air to said cylinder; which consists in supplying the cylinder with an explosive mixture of hydrocarbon and air over-rich in hydrocarbon, introducing a supplemental amount of air at atmospheric pressure into said cylinder adjacent the end of the piston near the end of the charging stroke sufficient in quantity to produce a constant volumetric charge in said cylinder irrespective of the amount of quality of the charge of explosive mixture and thereby supplying sufficient oxygen to the cylinder to cause complete combustion of the fuel, also introducing water into the cylinder by the inspiration of said supplemental air to increase the specific gravity of the charge, preventing escape from the cylinder of any of the supplemental air thus introduced, compressing the charge upon the return stroke of the piston, igniting the charge to impel the piston upon its working stroke and exhausting the products of combustion from the cylinder in part by the admission of air into the cylinder at the end of the working stroke.

3. The process of producing work from a four-cycle internal combustion engine comprising a cylinder having a piston reciprocable therein and means for supplying a regulated mixture of hydrocarbon and air to said cylinder; which consists in supplying the cylinder with an explosive mixture of hydro-carbon and air over-rich in hydrocarbon, introducing a supplemental amount of air at atmospheric pressure into said cylinder adjacent the end of the piston near the end of the charging stroke, preventing the escape from the cylinder of any of the supplemental air thus introduced, compressing the charge upon the return stroke of the piston, igniting the charge to impel the piston upon its working stroke, exhausting the products of combustion from the cylinder in part by the admission of air into the cylinder at the end of the working stroke.

In testimony whereof, I have signed my name to this specification.

WILLIAM L. DEMPSEY.